L. SHAW.
LOW LIMIT VALVE FOR GAS HOLDERS.
APPLICATION FILED MAY 26, 1909.
942,796.
Patented Dec. 7, 1909.
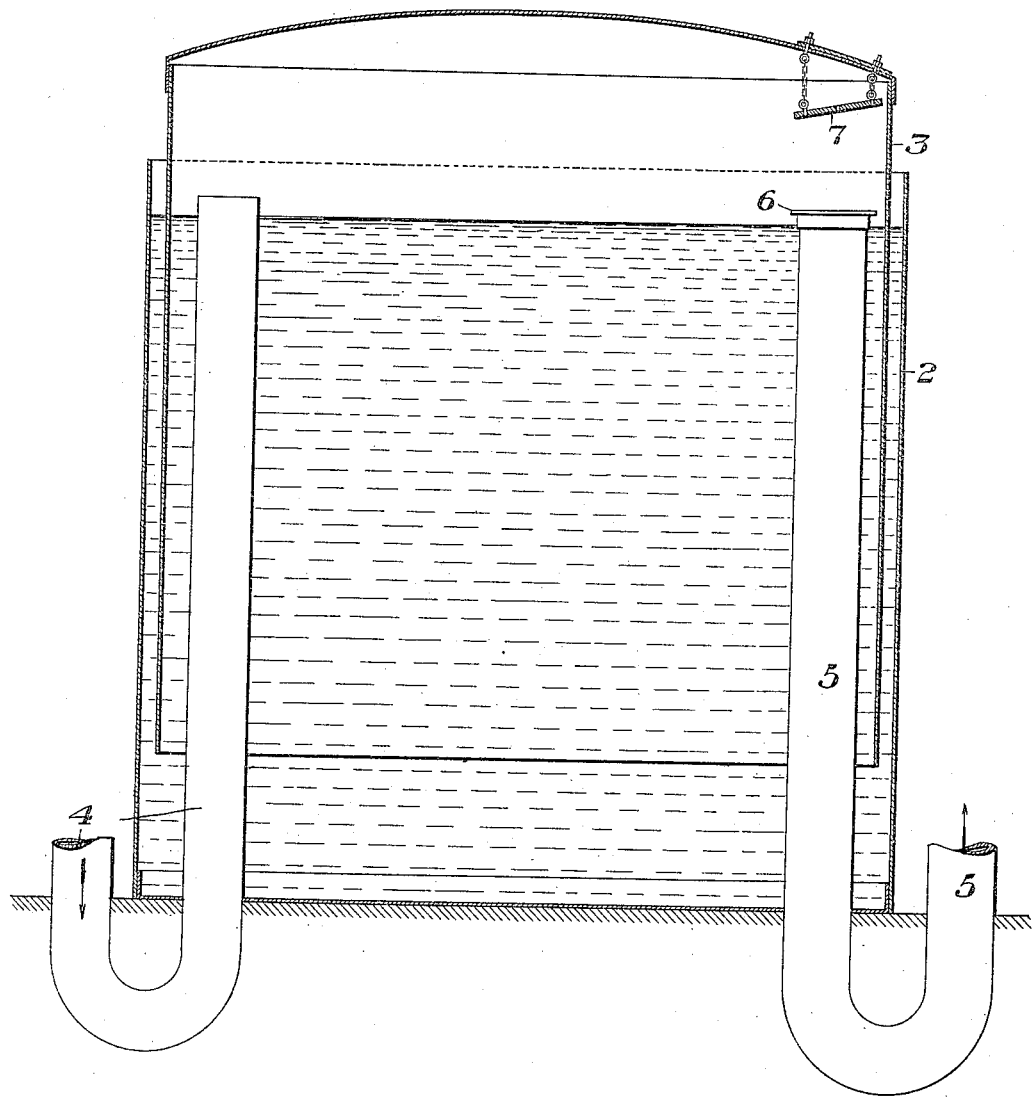
WITNESSES
INVENTOR

UNITED STATES PATENT OFFICE.

LEONARD SHAW, OF CHICAGO, ILLINOIS.

LOW-LIMIT VALVE FOR GAS-HOLDERS.

942,796.

Specification of Letters Patent. Patented Dec. 7, 1909.

Application filed May 26, 1909. Serial No. 498,516.

*To all whom it may concern:*

Be it known that I, LEONARD SHAW, of Chicago, in the county of Cook and State of Illinois, have invented a new and useful Improvement in Low-Limit Valves for Gas-Holders, of which the following is a full, clear, and exact description, reference being had to the accompanying drawing, forming part of this specification.

My invention relates to an improvement in gas holders, which are used for supplying gas to engines etc.

The object of my invention is to provide a cheap and efficient valve which will close the outlet from the gas holder when the bell or tank of the holder is emptied to a predetermined low limit, and thereby prevent the collapse of the bell which might be caused by the suction of a gas engine forming a partial vacuum in said holder.

The precise nature of my invention will be best understood by reference to the accompanying drawing which will now be described, it being premised, however, that various changes can be made in the details of construction and arrangement of parts without departing from the spirit and scope of my invention as defined in the claims.

In the accompanying drawing, I have shown a vertical section through a gas holder showing one form of my improved valve attached, and in which the numeral 2 designates the body or stationary member of the holder and 3 the movable tank or bell.

4 is a gas inlet pipe and 5 is a gas outlet pipe. Both of these pipes extend to a point slightly above the level of the water in the body portion 2 which form the usual seal for the tank.

The upper end of the outlet pipe 5 is provided with a flange 6, and attached to the bell or tank 3 is a disk valve 7 having a small orifice extending through said valve. This valve may be attached by any suitable flexible connection such as a chain or coupler. As shown in the figure, this valve is suspended at an angle so that when the bell 3 is lowered a sufficient distance to seat the valve on the flange, that portion of the valve which is held by the longest chain will first be seated on the flange and as soon as the valve is lowered a sufficient distance to allow the side of the valve which is suspended by means of a short chain to be seated, the further escape of gas into the pipe 5 is shut off. As soon as gas is admitted through the pipe 4 in a sufficient quantity to raise the dome 3, it will first raise the side of the valve 7 which is held by means of a short chain thereby equalizing the pressure in the outlet pipe 5, and overcome the pressure on the top of the valve.

The advantages of my invention result from the provision of a valve which will automatically close the gas outlet when the bell has been lowered to a predetermined point thereby overcoming the danger of forming a partial vacuum in the holder which is caused by the suction of the engine.

It will readily be understood by those familiar to the art that the partial vacuum formed in the retainer places the holder in danger from collapse due to the atmospheric pressure on the outside of the tank, which danger is entirely eliminated if the outlet is closed when the bell has been lowered to a predetermined point.

I claim:

1. A gas holder having a movable bell which is water sealed at its lower end, a gas inlet, a gas outlet above the water seal, and a valve supported from the bell and at an angle with relation to the top of the outlet pipe for closing the outlet pipe when the said bell reaches a predetermined level; substantially as described.

2. A gas holder having a movable bell which is water sealed at its lower end, a gas inlet, a gas outlet above the water seal, a valve seat on the end of said outlet pipe, and a valve for closing the outlet suspended from the top of the bell and at an angle with relation to said seat; substantially as described.

3. A gas holder having a movable bell which is water sealed at its lower end, a gas inlet, a gas outlet above the water seal, a valve seat on the upper end of the outlet pipe and a valve connected to the bell at an angle to said seat by means of flexible connections and arranged to seat on the seat and close the outlet when the bell has reached a predetermined level; substantially as described.

In testimony whereof, I have hereunto set my hand.

LEONARD SHAW.

Witnesses:
JOHN WIECHERT,
A. A. WILSON.